Figure 1:
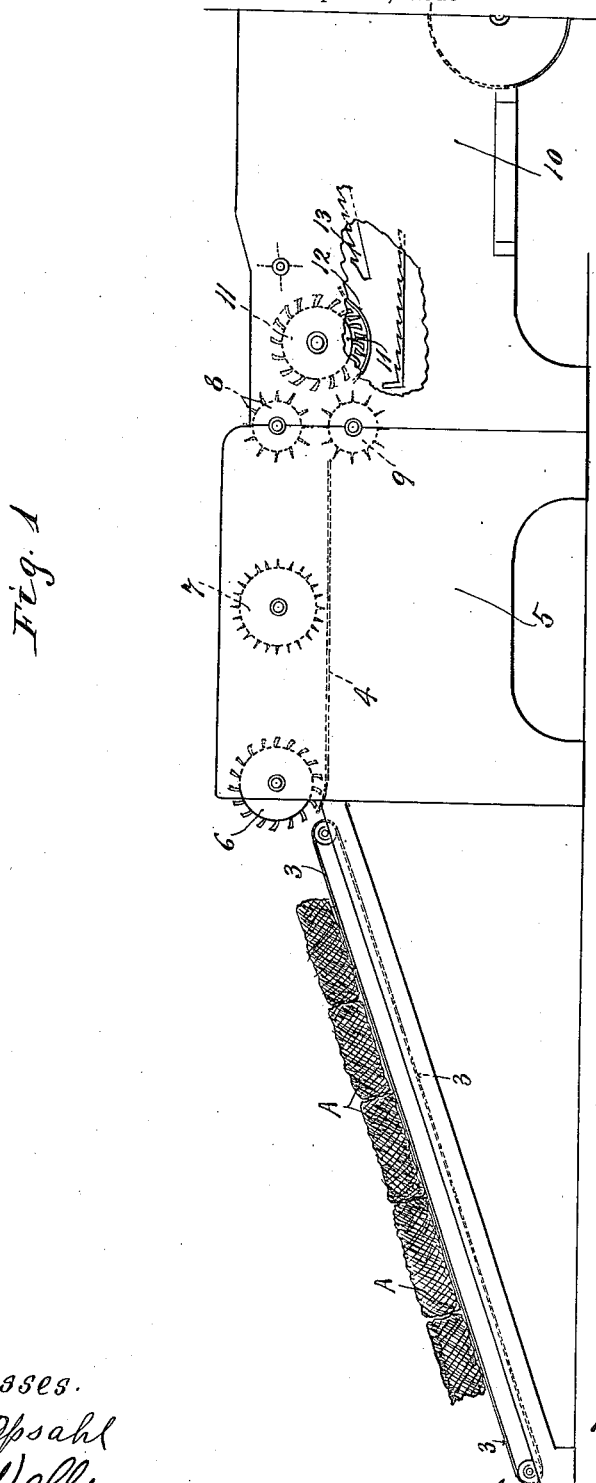

Mar. 6, 1923.

K. WESSEL

MACHINE FOR TREATING FLAX STRAW

Filed Apr. 7, 1919

1,447,449

5 sheets-sheet 1

Witnesses.
A. H. Opsahl
E. C. Wells

Inventor.
Karl Wessel
By his Attorneys
Williamson Merchant

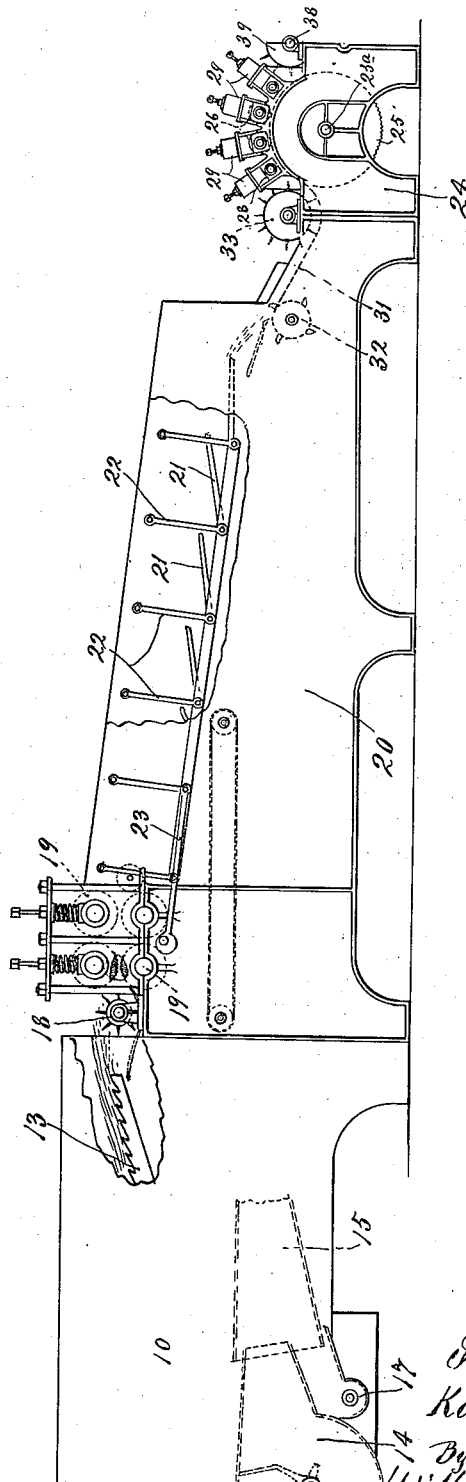

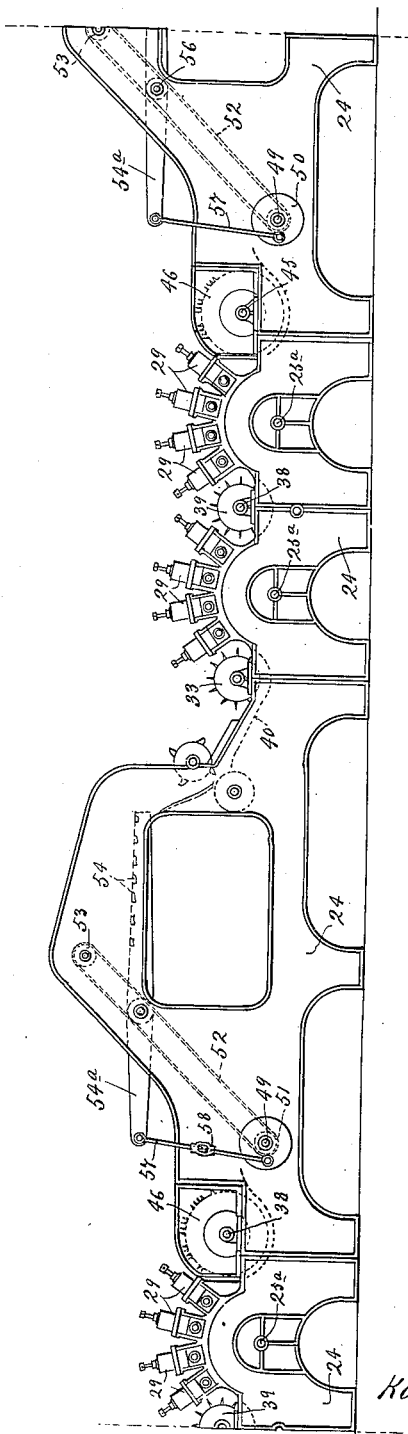

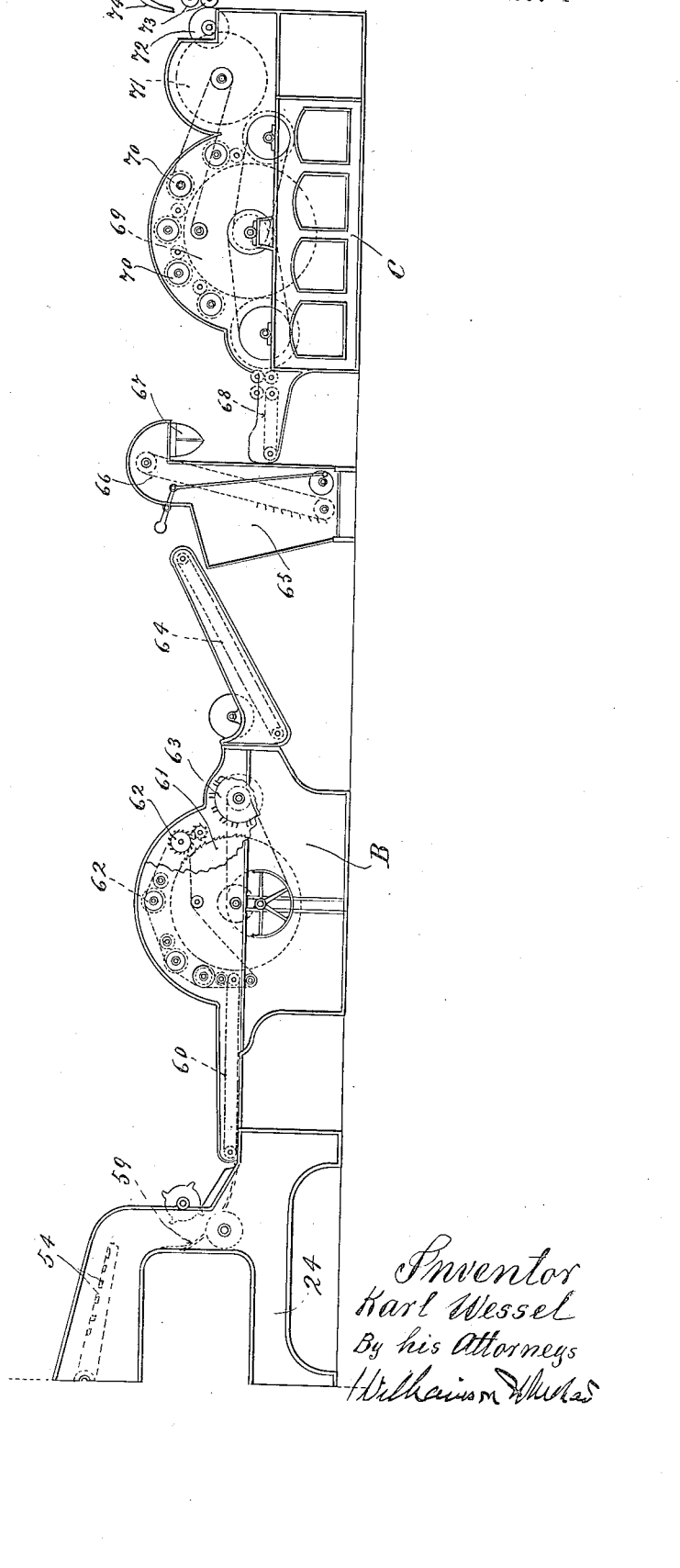

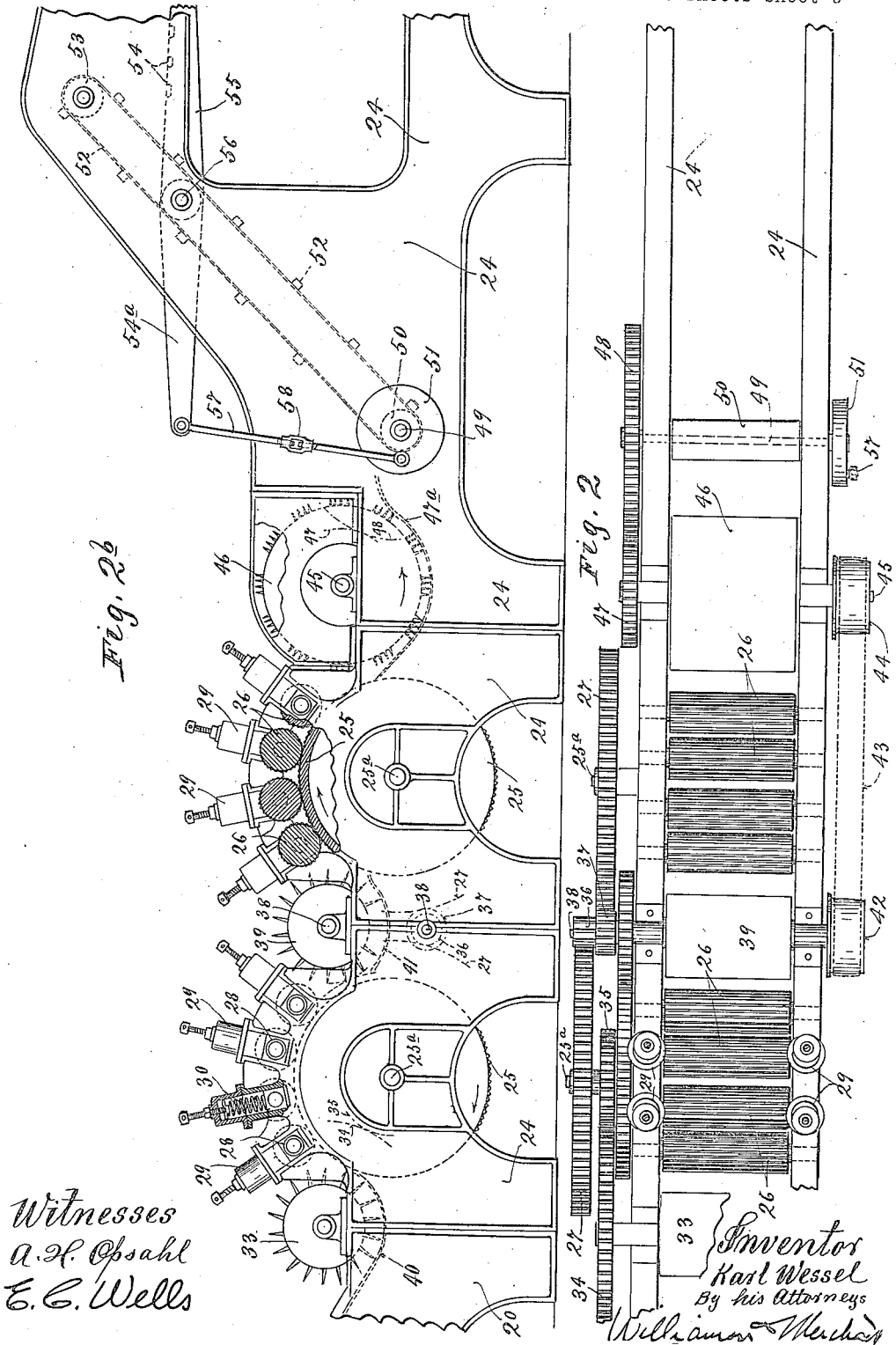

Patented Mar. 6, 1923.

1,447,449

UNITED STATES PATENT OFFICE.

KARL WESSEL, OF ST. PAUL, MINNESOTA.

MACHINE FOR TREATING FLAX STRAW.

Application filed April 7, 1919. Serial No. 288,191.

*To all whom it may concern:*

Be it known that I, KARL WESSEL, a citizen of the United States, residing at St. Paul, in the county of Ramsey and State of Minnesota, have invented certain new and useful Improvements in Machines for Treating Flax Straw; and I do hereby declare the following to be a full, clear, and exact description of the invention, such as will enable others skilled in the art to which it appertains to make and use the same.

My present invention has for its particular object the provision of a highly efficient machine especially adapted for the treatment of flax straw for the production of flax fiber suitable for spinning and various analogous purposes, according to the grade of flax. This flax fiber, usually designated as tow, is the main product of the machine, but various by-products are obtained. By incorporating a threshing machine as an element of the complete continuously operating machine, I reclaim or salvage from the flax straw, a considerably quantity of flax seed. This machine is especially intended for obtaining flax fiber from flax straw which has been raised, primarily, for seed purposes. Flax straw thus raised will usually be run through a threshing machine to obtain as much as possible of the seed from the straw and the straw is thereafter usually bailed in broken-up condition. These bails are delivered to my present improved machine and will be automatically opened up and delivered to the threshing machine above noted, this being located in and forming a part of the complete continuously operating machine.

From the threshing machine, the flax straw in still further broken-up condition will be delivered to a first group of breaking rollers which break up the shive or woody portion of the straw and then the straw passes to a shaker which shakes off as much as possible of the loose shives and dirt. From the shaker, the straw is passed through a plurality of breaking machines made up of steam heated corrugated drums and co-operating corrugated rollers. On passing from the shaker to the first breaking machine and from the first to the second breaking machine the straw is acted upon by combers in the form of toothed drums, and from the last breaking machine, the straw which has been reduced to fibrous form is delivered to a picker in the form of a toothed drum rotating at high speed. The above noted breaking machines, combers, and pickers are arranged in sets, and between each set, deliver to an elevator which, in turn, delivers onto secondary shakers which shake off the loosened shive and separates the same from the fiber. The fiber is next deliverd to a machine known as a breaker card, and from thence to a similar machine known as a finisher card.

With these general statements in mind, the machine will be described in detail. This machine is illustrated in the accompanying drawings wherein like characters indicate like parts throughout the several views. Referring to the drawings:—

Figs. 1, 1ª, 1ᵇ, and 1ᶜ, are sectional views in side elevation with some parts broken away and some parts shown diagrammatically illustrating the complete machine in the continuous operation for producing flax fiber for spinning purposes, or other uses, or for producing oakum, to wit, tow treated with tar;

Fig. 2 is a plan view of one set of breaking rollers and cooperating devices shown in Fig. 1ᵇ; and Fig. 2ᵇ is a side elevation of the parts shown in Fig. 2, some parts being broken away and some parts being sectioned.

The flax bails are indicated by the character A. These bails are placed on an endless power-driven elevator belt 3 and are thereby delivered to the receiving portion of a deck 4 supported by a framework 5. Overlying the receiving end of the deck 4 and journaled to the frame 5 is a bail opener 6 in the form of a rotary power-driven drum having coarse teeth suitable for tearing the bails apart, which operation is known as "opening the bails." The wires will be removed from the bails while they are being moved upward from the elevator belt 3 but before they reach the bail opener 6.

From the bail opener 6, the straw is delivered along the deck 4, to a power-driven picker 7 in the form of rotary drum having sharp pointed teeth which still further open and spread out the straw and deliver the same to the rear of the deck 4. At the rear of the deck 4, the straw passes between upper and lower toothed drums 8 and 9 journaled to the frame 5 and driven in the usual or any suitable way. These drums 8 and 9 deliver the straw to the cylinder and concave of the threshing machine which is incorporated as a part of the complete machine. This threshing machine may be of any of the well known standard types, such as the J. I. Case threshing machine and of the parts thereof, it is desirable for the purposes of this case to note only the casing 10, the threshing cylinder 11, the concave 12, the vibratory straw feeding rack 13, the frame 14, the feed pan 15 and the seed spout 17.

In passing through this threshing machine, any flax seed not obtained from the straw by the preliminary threshing performed prior to bailing of the straw, will be reclaimed and saved, and in practice, I have found that about one-half bushel of flax seed per ton of straw may thus be obtained and saved. Also, in passing through the threshing machine, dirt, some of the shive which has been loosened up by the bail opener and picker, and some of the shorter fiber will be precipitated from the straw. From the delivery end of the straw rack 13, the straw will be passed first over a toothed breaker roller 18 and thence between pairs of corrugated primary breaking rollers 19. The rollers 18 and 19 may be driven by any suitable well known means and they are mounted in suitable bearings on the framework 20. The upper rollers 19 are spring-pressed against the lower rollers. In passing between these rollers 19, the shive or woody portion of the fiber will be broken to a considerable extent and much of the shive will be loosened up. From these primary breaking rollers, the straw is delivered to a sub-shaker which, as illustrated, is of the type used in the well know "Advance-Rumley" so-called "Ideal" separator, and comprises a plurality of the slat sections 21 carried by links 22 and connected for common vibratory movements from an eccentric driven connecting rod 23. By the action of these vibrating slat sections 21, the straw will be fed onward and the loosened shives will be rattled through and separated from the straw.

By the time the straw passes from the shaker described, it will begin to assume a fibrous form and coarse portions of the shives will have been removed therefrom but the main reduction of the fiber and separation of the shives remains to be done by the breaking machines to which it is next passed. As already indicated, there should be several of these breaking machines. In the drawings, I have shown two such machines connected in tandem. Each of these breaking machines comprises a suitable framework 24, two hollow steam-heated externally corrugated drums 25, cooperating corrugated presser rollers 26 and the combing drums and picker already noted. The shafts 25ª of the drum 25 are journaled in the framework 24, and at one end, are provided with large spur gears 27. The rollers 26 are journaled in bearings 28 movably mounted in guide extensions 29 of the frame 24 and are subject to springs 30 which press the said rollers against the cooperating drums. The rollers 26 are caused to rotate by their corrugated engagement with the cooperating drums.

As the straw passes from the last section 21 of the shaker described, it passes to an inclined deck 31 and over a toothed feed roller 32. This toothed roller 32 feeds the straw in an even layer over the deck 31 and to the first toothed combing drum 33. The shaft of this first combing drum 33 is journaled on the frame 24 and is provided at one end with a spur gear 34 that meshes with a spur gear 35 on the shaft 25ª of the first breaking drums 25.

The gears 27 of the first and second drums 25 mesh with pinions 36 and 37, respectively, on the shaft 38 of the second combing drum 39, which latter is arranged between the two drums. The two combing drums 33 and 39 work over smooth concaves 40 and 41, respectively. At its other end, the shaft 38 is provided with a pulley 42, and a belt 43 runs over this pulley and over a pulley 44 on one end of the shaft 45 of the tooth picker drum 46. This picker drum 46, as already noted, acts on the fiber as it comes from the second breaking drums 25 and it is arranged to work over a smooth spindle deck 47 supported by the frame 24. At its opposite end, the shaft 45 is provided with a spur gear 47 that meshes with a large spur gear 48 on one end of a transverse shaft 49 that carries a roller 50, and at the opposite side of the machine, is equipped with a crank disk or head 51. An endless elevator belt 52 runs over the roller 50 and over an elevated guide roller 53 journaled in the upper portion of the frame 24.

The elevator belt 52 delivers onto a vibratory shaker rack 54 that operates as a secondary shaker and, as shown, is carried by a long arm 55 secured to cross shaft 56 journaled in the sides of the frame 24 and provided with a forwardly extended arm 54ª. Arm 54ª is connected by a rod 57 to the wrist pin of the crank disk 51. Rod 57 is preferably provided with a turn buckle 58 by means of which it will be lengthened and shortened so as to give the proper rearward inclination to the rack 54 required to effect a progressive rearward movement of the fiber as it is being shaken, to free the same from the shives.

The important relative arrangement of the parts shown particularly in Figs. 2 and 2ᵇ, will be further considered in the description of the operation.

From the last secondary shaker 54, the fiber will be delivered to a downwardly curved deck 59, and thence to a carding machine indicated, as an entirety, by the letter B. This carding machine is, or may be of the well known standard construction, and hence, the parts thereof may be briefly noted, as follows:

An endless receiving feed belt 60, drum 61, rollers 62 tooth picker drum 63 and endless delivery belt 64. The belt 64 delivers to the hopper 65 of the feed device which has a toothed elevator belt 66 delivering to discharge spout 67. The spout 67 delivers the fiber to a machine known as a finishing card, which machine is also of well known construction and is indicated, as an entirety, by the character C. Certain of the parts of this finishing card may be briefly noted as follows:

The receiving feed belt 68, drum 69, cooperating rollers 70 to the cylinder 71 and doffer roller 72. Fiber suitable for lining purposes, or the like, will be delivered from the doffer 72. Where the fiber is to be used to make oakum, it will be delivered between a pair of suitably driven rollers 73 and the liquid pine tar will be delivered onto the fiber through a spout or tube 74 at a point just in front of the rollers 73, so that, in passing between the rollers, the tar will be thoroughly and evenly distributed and pressed into the fiber.

The operation of the machine summarized, is as follows:

The manner in which the bails A are opened up and fed to the threshing machine for the reclaiming of the flax seed and preliminary breaking up of the straw, has already been fully noted, as has also the manner in which the preliminary breaking of the shive and partial separation thereof from the fiber in the passage of the fiber through the primary breaking rollers 19, and over the racks 21 of the primary or first shaker. When the fiber reaches the deck 31, it will be in bunched-up and tangled form but will be straightened out to a very considerable extent by the first toothed combing drums 33, and from thence it will pass between the first steam heated cylinder 25 and the cooperating corrugated rollers 26. The first combing drum 33 has a peripheral speed, say of 150 feet per minute, while the first drum 25 and rollers 26 have a peripheral travel of approximately 270 feet per minute. This gives the first stretching of the fiber with a tendency to turn the same longitudinally of the direction of travel. The second combing drum 39 has a peripheral speed of approximately 275 feet per minute, which gives still further straightening out and stretching of the fiber, and the second drum 25 and its cooperating rollers 26 have a still higher peripheral speed of approximately 420 feet per minute, which obviously, still further stretches and straightens out the fiber. The breaker drum 46 has still a much higher speed than the other parts noted, towit, a peripheral speed of something like 3000 feet per minute, so that it will comb out the fiber as it delivers the same to the elevator belt 52. In thus passing between the drums 25 and their cooperating rollers 26, the fiber and the shives will be rapidly dried and the fiber made brittle at the very time it is being subjected to the breaking action produced by the corrugations of the drum and rollers, and this insures the best kind of breaking up of the shives and loosening of the same from the fiber.

From the first elevator belt 52, the fiber passes onto the first secondary shaking rack 54 and it is shaken up and delivered over the said rack, the shives will be rattled through the rack while the fiber will be delivered onward to the next breaking machine or set of rollers and cooperating elements, such as shown in Figs. 2 and 2$^b$. In the complete machine illustrated, the above described operation of drying and breaking the shives and separation thereof from the fiber is repeated but a second time, but the machine may be designed to repeat said operation as many times as found necessary. Each time that the operation of drying and breaking the shives is repeated, the fiber will be bunched or tangled up more by the action of the shaking rack 54 and each time it is run through a breaking machine of the character described, it will be combed and straightened out until the shives have been entirely removed from the fiber and the fiber reduced to the condition required for spinning or other purposes.

All of the operations described are carried out in sequence and by a continuous operation so that, in the one instance, flax straw, as it comes from the field or from a threshing machine, will be converted into fiber suitable for spinning or for oakum, depending on whether or not the tar is supplied to the fiber as a final step, and in a manner already noted.

This machine is especially designed for obtaining fiber from flax, but may be used on other fiber producing straws or stems. Hitherto, disassociated machines have been used for the reduction of flax straw, and the like, to fibrous condition and hand operations have been required for the transfer of the fiber from one machine to another. This improved machine performs all of these operations automatically and in the proper order. Moreover, the machine involves various highly important novel features and combinations of features, all as will be defined in the claims.

What I claim is:

1. In a machine for obtaining fiber from fibrous producing straw, a breaking machine comprising at least two corrugated driven breaking drums, corrugated rollers cooperating with each breaking drum, a toothed combing drum operating on the straw as it passes to the first drum, a second tooth combing drum operating on the straw as it passes from the one drum to the other, and a tooth picker drum operating on the straw as it passes from the second or last breaking drum.

2. In a machine for obtaining fiber from fibrous producing straw, a breaking machine comprising at least two corrugated driven breaking drums, corrugated rollers cooperating with each breaking drum, a toothed combing drum operating on the straw as it passes to the first drum, a second tooth combing drum operating on the straw as it passes from the one drum to the other, a tooth picker drum operating on the straw as it passes from the second or last breaking drum, the first breaking drum having a peripheral speed higher than that of the first combing drum, the second combing drum having a peripheral speed higher than that of the first breaking drum, the second breaking drum having a peripheral speed higher than that of the second combing drum and said picker drum having a peripheral speed higher than that of the second breaking drum.

3. In a machine for obtaining fiber from fibrous producing straw, the combination with a corrugated breaking drum and cooperating corrugated breaking rollers, of tooth combing drums, the one operating on the straw as it passes to said breaking drum and the other operating on the straw as it passes from said breaking drum, the said breaking drum having a peripheral speed greater than that of the first combing drum and the second combing drum having a peripheral speed greater than that of said breaking drum, and the said breaking drum being made hollow for the reception of steam to heat the same, a second set of elements such as just enumerated, and means for delivering the straw from the one set to the other whereby continuous and repeated operation on the straw fiber is effected.

4. In a machine for obtaining fiber from fibrous producing straw, a breaking machine comprising at least two corrugated driven breaking drums, corrugated rollers cooperating with each breaking drum, a toothed combing drum operating on the straw as it passes to the first drum, a second tooth combing drum operating on the straw as it passes from the one drum to the other, and a tooth picker drum operating on the straw as it passes from the second or last breaking drum, a second set of elements such as just enumerated, and means for delivering the straw from the one set to the other whereby continuous and repeated operation on the straw fiber is effected.

In testimony whereof I affix my signature in presence of two witnesses.

KARL WESSEL.

Witnesses:
CLARA DEMAREST,
F. D. MERCHANT.